INVENTORS
MAXIME G. KAUFMAN
JOSEPH P. DOUGHERTY

BY

ATTORNEY

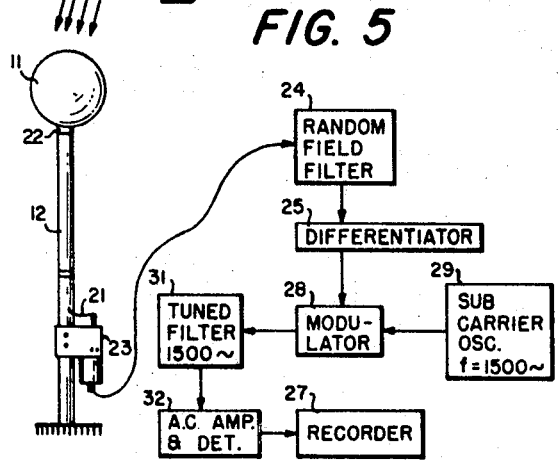
FIG. 5
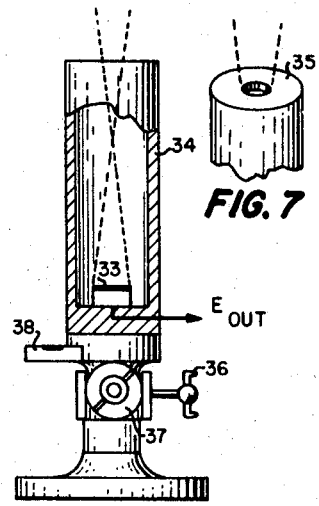
FIG. 7
FIG. 4
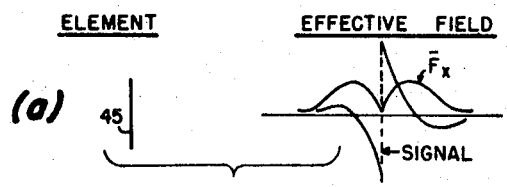
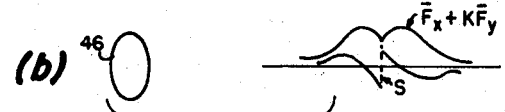
FIG. 6
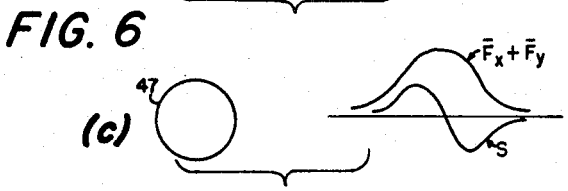
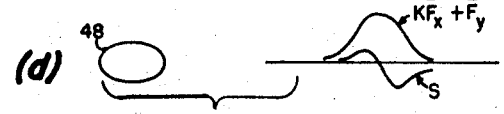
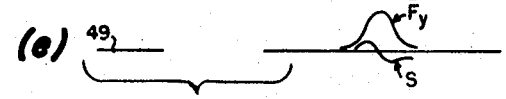

United States Patent Office 3,564,529
Patented Feb. 16, 1971

3,564,529
ELECTROSTATIC FIELD RATE DETECTOR
Maxime G. Kaufman, Camp Springs, Md., and Joseph P. Dougherty, Springfield, Va., assignors to the United States of America as represented by the Secretary of the Navy
Filed Oct. 21, 1965, Ser. No. 500,442
Int. Cl. G01r 29/12
U.S. Cl. 340—258          1 Claim

ABSTRACT OF THE DISCLOSURE

A system and method for electrostatically detecting the distance of one object from another utilizing a conductor placed in the electrostatic field of the moving object so that a rearrangement of charge on the conductor's surface occurs and this shifting of charge is directed through an impedance so that a voltage is developed which is a measure of the field strength causing the change in charge of the conductor. An input circuit, a differentiator, an amplifier, a recorder, and a sphere, as the conducting or detecting element, comprise the basic apparatus of this invention.

---

The invention described herein may be manufactured and used by or for the Government of the United States of America for governmental purposes without the payment of any royalties thereon or therefor.

The present invention relates to a system for detecting an electrostatic field and more particularly to a method and apparatus by which a space vehicle may electrostatically detect the distance from another space vehicle by sensing its electrostatic field.

In the past, the problem of measuring distance down to a zero range has been given serious consideration. Systems for measuring this distance between a moving object such as an aircraft, missile or space vehicle and another aircraft, missile or space vehicle have been needed. Several approaches have been taken in utilizing various mediums such as the magnetic field, the electromagnetic field, radioactive radiation, sound, light, and heat. In certain detection applications, it has been desirable to avoid using an active system such as radar, so that electronic beams are not produced that disclose the location of the tranmsitter. A simple system using passive techniques was desired which would be undetectable and which required but a minimum of equipment and space.

It has been observed that an object which is a conductor moving through space acquires an electrostatic charge. Because the object is essentially a conductor, it must be an equal potential surface as well, so that the charge distributes itself most densely on surfaces of smallest radius of curvature, and less densely where the radius of curvature is greater. This charge produces an electrostatic field of force about the object which is the resultant of the forces produced by the complex charge distribution over the object's surface. However, even at distances relatively near the object, equal potential surfaces become spherical and therefore the field may be considered as emanating from an isolated point charge. The field distribution of an isolated charged sphere is known to follow the familiar inverse square law because of the spreading effect of the field. This electrostatic field about the moving object provides a means of detecting its presence. If a conductor is placed in the electrostatic field of the moving object, a rearrangement of charge on its surface occurs so that lines of force impinge normal to its surface at all points. If this shifting of charge is directed through an impedance, a voltage is developed which is a measure of the field strength causing the motion of the charge. A conductor, connected through an impedance to ground, which is in an electric field, produces a charge to terminate the field which is equal to the product of flux density of the field and a conductor area normal to the field. A voltage or signal is developed across the impedance due to the charged displacement. This signal arises from two sources, one from changes in the area of the conductor, the second from changes in the impinging flux density area. Each source provides a component of the signal; the first is directly proportional to the field strength, and is used to measure quasi-stationary fields, while the second is proportional to rate of change of field, and is used as a measure of dynamic fields.

The general purpose of this invention is to provide a field-rate detector which utilizes the electrostatic field as the detecting medium and does not transmit a detectable signal so that its location is not easily detected and which employs a minimum of equipment. In one embodiment a stationary detecting element is employed which is mounted on a mast fixed to the earth over which a charged aircraft passes. The detector element comprises a conductive sphere mounted on the mast so that the sphere is the highest object in the immediate vicinity. As an optional feature, a photocell unit is employed near the detector to determine the time when an aircraft, for example, is in the overhead position. The aircraft's shadow causes a pulse to be generated by this photocell, which in turn is recorded beside the recording of the generated detector signal. This allows checking of the aircraft's cross-over time and establishes the relative position of the aircraft with respect to the vertical from the detector. As the aircraft passes over the detector, the amplitude of the detected signal changes as the range to the aircraft changes.

The input circuitry for the field-rate detector is a high input impedance followed by a differentiator, amplifier, and a recorder. In other words, an input circuit, a differentiator, an amplifier, a recorder, and a sphere as the detecting element, are the elements which comprise the basic apparatus of this invention. With this invention it is not necessary to know the specific magnitude of the aircraft's charge, since the controlling factor is the rate of change of the electrostatic field. This invention, therefore, provides a method and apparatus for detecting a charged moving object and for measuring the miss-distance between the detector and the moving charged object to be detected.

Another important variation involves utilizing the basic invention in conjunction with a moving object passing another moving object. This technique is useful in a space vehicle which is passing or approaching another space vehicle.

An object of the present invention is the provision of a field-rate detector for measuring the rate of change of the electrostatic field at a detector due to the passing of an electrically charged object.

Another object is to provide a method and apparatus for measuring the miss-distance between two space vehicles electrostatically.

A further object of the invention is the provision of a space vehicle field-rate detector which is passive and virtually undetectable.

Still another object is to provide a satellite field-rate detector which is simple, reliable and which utilizes a minimum number of components.

Other objects and many of the attendant advantages of this invention will be readily appreciated as the same become better understood by reference to the following detailed description when considered in connection with the accompanying drawings in which like reference numerals designate like parts through the figures thereof and wherein:

FIG. 4 is an illustration of a photocell detector being used in conjunction with the apparatus of FIG. 3;

FIG. 5 is a schematic diagram of a field-rate detector system employing a sub-carrier technique; and FIGS. 6a–e are representations of different shaped detector elements together with their corresponding effective field curves.

FIG. 7 illustrates the opening in the top of the device shown in FIG. 5.

Figure 1:
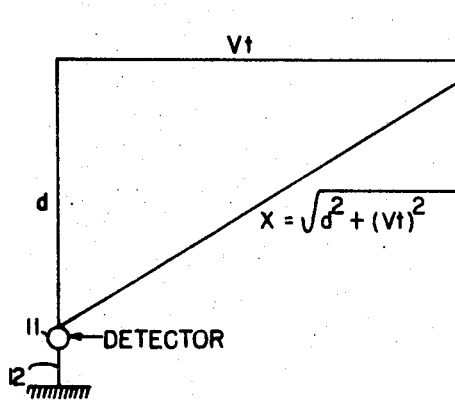
FIG. 1 is a schematic representation of a typical stationary detector illustrating geometrically the relationship between a stationary detector and a moving aircraft.

Referring now the drawings, wherein like reference characters designate like parts, there is shown in FIG. 1 a stationary detector 11 in the form of a conductive sphere mounted on a mast 12. A charged target aircraft 13 is shown approaching the detector element 11 at an unknown height $d$. FIG. 1 shows the geometric relationship between the stationary detector 11 and the moving aircraft 13. The distance between the aircraft 13 and the detector 11 is given by the equation $$x = \sqrt{d^2 + (Vt)^2} \quad (1)$$

where $x$ is the distance between the aircraft 13 and the detector 11, $d$ is the height or vertical component of the aircraft's position relative to the detector, $V$ is the relative velocity, known or determined, of the approaching aircraft, and $t$ is the time of travel of the aircraft from its instantaneous position to a position directly over the detector. The field-rate equation is given as follows:

$$E = \frac{KQ_p}{d^2 + (Vt)^2} \text{ volts/meter} \quad (2)$$

where $E$ is the field strength, $Q_p$ is the charge on the aircraft, $K$ is a constant of proportionality, and $V$, $d$, and $t$ are as previously defined above. The field-rate Equation 2 is derived as follows:

The field strength $E$ is directly proportional to the charge on the aircraft, $Q_p$, and inversely proportional to the square of the distance, $x$, to the aircraft, so that $$E = \frac{KQ_p}{x^2} \text{ volts/m.} \quad (3)$$

Since $x = \sqrt{d^2 + (Vt)^2}$ as defined in Equation 1, the field-rate equation is directly obtained by substituting this value of $x$ into Equation 3.

Field-rate Equation 2 is maximized by differentiation in order to obtain a simplified relationship involving the miss-distance as follows:

$$\dot{E} = -\frac{2KQ_p V^2 t}{[d^2 + (Vt)^2]^2} \text{ volts/m./s.} \quad (4)$$

Figure 2:
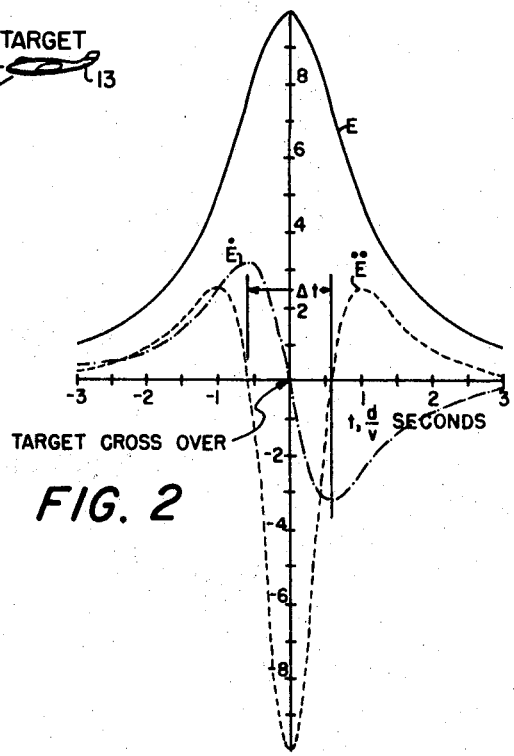
FIG. 2 illustrates a set of curves showing the relationship between the field strength, and its first and second derivative.

FIG. 2 illustrates a set of curves showing how the field strength $E$, and its first and second derivatives, $\dot{E}$ and $\ddot{E}$, respectively, vary at the detector element. These waveforms are obtained by plotting the signal and its first time derivative which are represented by Equations 2 and 4. It is to be noted from these expressions that the field-rate varies directly with the target velocity and charge and inversely with the square of the miss-distance.

In determining the miss-distance, the charge on the target need only stay constant during the interval that it is influencing the detector. This condition is easily satisfied, since the time increment is usually small. Hence a simple relationship can be derived involving the miss-distance independent of charge. The relationship assumes that the charge and the velocity remains substantially constant during the time the measurement occurs.

Additionally, by taking the second derivative of field Equation 2, a value of $t$ can be obtained to give the time between zero crossings of the signal waveform representing $\ddot{E}$. This time between zero crossings is proportional to the miss-distance. An analysis of Equation 4 and FIG. 2 reveals that should the charge on the aircraft change, on successive passes at the same miss-distance $d$, the amplitude of the signal will change, but the time increments between the peaks of the recorded curve will remain the same for each pass. Consequently, as shown by the illustrated curves of FIG. 2, the specific magnitude of the aircraft's charge need not be known; therefore, the ordinates involved in the curves can be arbitrary.

The time increment, $\Delta t$, shown as the distance between the peaks of the first derivative signal curve $\dot{E}$, or the time between zero-crossings of the second derivative curve $\ddot{E}$, is used to determine miss-distance, $d$, according to the following expression:

$$\Delta t = 1.154 \frac{d}{V} \text{ seconds} \quad (5)$$

Equation 5 results from maximizing Equation 4 with respect to the time parameter $t$ as follows:

$$\ddot{E} = \frac{-2KQ_p V^2 (d^2 - 3V^2 t^2)}{(d^2 + V^2 t^2)^3} = 0$$

$$t = \pm 0.577 \frac{d}{V}$$

$$\Delta t = 1.154 \frac{d}{V} \quad (6)$$

Figure 3:
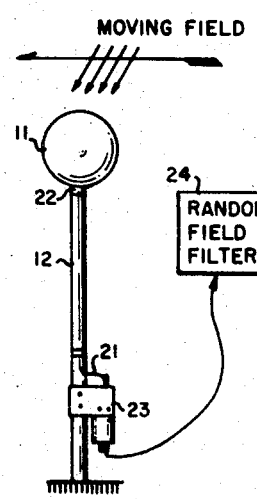
FIG. 3 is a schematic diagram of a system of this invention employing a D.C. coupling technique.

FIG. 3 illustrates schematically the electrostatic field-rate detector of the present invention which comprises a conductive spherical detector 11 supported by a vertical rod 12 having an insulator 22 between the rod 12 and the spherical detector 11 to electrically insulate spherical detector 11 from the rod 12. The rod 12, which may be of Bakelite or any other low leakage material, together with the insulator 22, has a passage therethrough for enclosing an electrical wire 21 for electrically interconnecting the spherical detector 11 to the circuitry for processing the signal developed by the detector. Electrical wire 21 is connected to the spherical detector 11 and passes through the passage in insulator 22 and rod 12 to a high-input impedance circuit 23 which is in turn coupled to a random field filter 24, differentiator 25, D.C. amplifier 26, and an output device 27 shown as a recorder. For high sensitivity, detector element 11 is connected to a high impedance circuit because of the current generating nature of detector 11 as a source. A conventional balanced cathode-follower circuit is utilized since the input impedance realized with that circuit is sufficiently high to obtain adequate sensitivity and yet not so high as to degrade the signal-to-noise ratio. A compact unit may be obtained by mounting the cathode follower circuit 23 on rod 12 near the conductive spherical detector 11 as shown in FIGS. 3 and 5. Cathode follower 23 is then coupled, at a low impedance, to the input of D.C. amplifier 26 through differentiator circuit 25.

FIG. 4 illustrates a photocell unit to be mounted near the detector's supporting means 12 in a ground-type system or in an airborne system. The photocell unit provides an indication, during daylight operation, of the time at which the moving object to be electrostatically detected passes over the detector 11 of FIGS. 3 and 5. The shadow of the moving object causes a pulse to be generated by this photocell; this pulse is then recorded beside the recording of the signal which is indicative of the changing electrostatic field strength of the charged approaching object. Use of the photocell technique allows checking of the aircraft's minimum range time and also provides an indication of the aircraft with respect to the vertical of the detector 11. A photocell 33 is mounted in a cylinder 34 that allows only a small solid angle to be observed as shown in the cutaway 35 of the top portion of cylinder 34 of the photocell unit.

Orientation controls 36 and 37, together with level indicator 38 are provided. The photocell unit, of course, is optional and is not necessary for system operation.

FIG. 5 illustrates another embodiment of the electrostatic detector system of this invention. This embodiment provides a sub-carrier modulation technique as opposed to the D.C.-coupling technique illustrated in FIG. 3. In the embodiment of FIG. 5 a high-input impedance circuit 23 is shown electrically coupled to the spherical detector 11 which in turn is coupled to random noise filter 24. A modulator 28 receives the signal through differentiator 25 which is coupled to filter 24 and also receives a signal from a sub-carrier oscillator 29 which provides a reference frequency. The output of modulator 28 is coupled to a tuned filter 31 which is tuned to the frequency of the reference sub-carrier oscillator 29 and coupled to an A.C. amplifier and a signal detector shown as a unit 32 in FIG. 5. An output means 27, such as a recorder, is employed to provide an indication of the processed signal from the spherical detector. In each of the embodiments of FIG. 3 and FIG. 5, when used as a ground system, the output of the photocell unit shown in FIG. 4 is fed into a separate input (not shown) of the output device 27. By means of the signal from the photocell unit of FIG. 4, a correlation can be obtained between the output resulting from the signal developed by the spherical detector and the pass-over time of the moving charged object to be detected.

The subcarrier technique illustrated in FIG. 5 is advantageous where the period of the detected signal, which depends upon the velocity and/or the range of the approaching charged object, is relatively long. The sub-carrier technique allows A.C. amplification and eliminates the drift problem associated with D.C. coupling.

In another embodiment of this invention a second differentiator is added in the circuit in series with differentiator 25 of FIGS. 3 and 5. With the addition of the second differentiator, the second derivative, cure $\ddot{E}$ of FIG. 2 is obtained at the output device 27. The miss-distance is then proportional to the time between zero-crossings of the $\ddot{E}$ signal, which are easier to discern than the peaks of the $\dot{E}$ waveform in accordance with the first technique previously discussed. As an added feature, a zero-crossing detector may be employed to provide an output signal indicative of the zero-crossing times. An analog circuit may then be used to provide an analog signal proportional to the time between zero-crossings and hence proportional to the miss-distance.

FIGS. 6a–e illustrates a variety of electrostatic field sensing elements which may be employed in the electrostatic detection system of this invention. The elements shown are a vertical detector 45, vertical-elliptical detector 46, spherical detector 47, horizontal-elliptical detector 48, and horizontal detector 49. Each detector element is shown with its corresponding effective field curve. An important consideration for the electrostatic detection system of this invention is the shape of the detector element since the conduction area of the detector presented to the moving object's field affects the sensitivity of the field-rate detector. In the spherical configuration 47, the area normal to the field is a constant as the moving object passes the detector element. On the other hand, with the horizontal plate detector shown in configuration 49, only the vertical component of the field is detected. Similarly, if a vertical plate detector as shown in configuration 45 is employed, only the horizontal component to the field is detected. Neither component of the field can be greater than the resultant field. However, the maximum rate of change of either component may exceed the maximum rate of change of the result. In the effective field curves of FIG. 6, $\overline{F_x}$ is the horizontal component field, and $\overline{F_y}$ is the vertical component of the field. The differentiated output signal (S) with its respective effective field curve is also shown. Of all the configurations shown, the spherical detector element 47 provides the greatest sensitivity.

It is therefore seen that the general purpose of the apparatus herein disclosed is to process a signal developed by the detector element to provide a measure of the rate of change of electrostatic field strength causing the motion of the charge in the detector. It is within the spirit of this invention to employ other apparatus to process that signal to provide a signal from which the miss-distance of an approaching charged object is obtained.

The above description relates to an electrostatic detection system which is employed to sense the rate of change of the electrostatic field of a moving charged object. This system may also be employed to measure any quasi-stationary electric field such as that formed by the exhaust wake of a space vehicle. It is to be understood that the same principles and the same apparatus are employed whether the detector is stationary or is carried by a moving object such as a space vehicle. In practice, this invention is primarily intended for use on a space vehicle for detecting the passing or approach of another space vehicle. In that environment, the apparatus herein described is carried by the detecting space vehicle. In its broadest application, however, the detecting system may be carried by any moving object where it is desired that that moving object sense another moving charged object. This invention also provides different specific embodiments for processing and recording the signal developed at the detecting element. The method provided by this invention relates generally to the application of electrostatic principles to the detection of field strength and the rate of change of electrostatic field strength of moving charged objects.

Obviously, many modifications and variations of the present invention are possible in the light of the above teachings. It is therefore to be understood, that within the scope of the appended claim, the invention may be practiced otherwise than as specifically described.

What is claimed and desired to be secured by Letters Patent of the United States is:

1. A system for electrostatically detecting the miss-distance of an approaching charged object comprising:
   an electrostatic detector,
   means for supporting said detector so that it is positioned at the highest point in the surrounding area,
   input circuit means positioned on said means for supporting said detector and electrically coupled to said detector,
   insulating means for electrically insulating said detector from said means for supporting said detector,
   circuit means for processing the signal developed by said detector coupled to said input circuit means for providing a signal proportional to the rate of change of said electrostatic field detected by said detector, and
   a photocell detector adjacent to said electrostatic detector and said means for supporting said detector,
   said photocell detector being coupled to said circuit means for providing an indication of the rate of change of said electrostatic field for indicating the time during which said charged object to be detected passes over said electrostatic detector.

References Cited
UNITED STATES PATENTS

| | | | |
|---|---|---|---|
| 1,387,552 | 8/1921 | Merritt | 324—72 |
| 2,061,115 | 11/1936 | Tebo et al. | 324—72 |
| 2,591,898 | 4/1952 | Webster | 324—72X |
| 2,802,178 | 8/1957 | Shafer et al. | 340—200X |
| 2,813,230 | 11/1957 | Fruengel | 340—258UX |
| 3,218,623 | 11/1965 | Buntenbach | 324—72X |

THOMAS B. HABECKER, Primary Examiner

D. L. TRAFTON, Assistant Examiner

U.S. Cl. X.R.

324—72